United States Patent [19]

Miller

[11] 3,780,574

[45] Dec. 25, 1973

[54] WELL PRESSURE MEASURING AND RECORDING DEVICE

[76] Inventor: Leonidas C. Miller, 1321 Sombrero Dr., Monterey Park, Calif. 91754

[22] Filed: June 14, 1972

[21] Appl. No.: 262,779

[52] U.S. Cl. .................................. 73/151, 73/391
[51] Int. Cl. ...................... E21b 49/00, G01l 19/08
[58] Field of Search.................... 73/391, 151, 152, 73/411

[56] References Cited
UNITED STATES PATENTS

| | | | |
|---|---|---|---|
| 1,837,222 | 12/1931 | Kannenstine | 73/391 |
| 2,602,331 | 7/1952 | Moosman | 73/151 |
| 3,232,115 | 2/1966 | Bennett et al. | 73/152 |

*Primary Examiner*—Donald O. Woodiel
*Attorney*—Charles G. Lyon et al.

[57] ABSTRACT

A device adapted to be lowered into a well on a wire line for measuring and recording well pressure employs a multiple-turn cylindrical Bourdon tube carried by a housing and having its interior exposed to well pressure. An axially-extending pin driven by said Bourdon tube is mounted to turn in the housing. A shaft having a wedge-shaped groove in its outer surface is connected to the pin at one end and is connected at the other end to drive the slow speed shaft of a motion multiplier gear device. A recording mechanism in the housing of the movable member is connected to be driven by the high speed shaft of the motion multiplier device. Two radial pins each carried by a separate rotary collar project into the shaft groove to limit turning movement of the shaft in both directions when their respective collars are fixed relative to the housing. The Bourdon tube may be pressurized when at the ground surface and the position of the radial pins adjusted in the shaft groove so that the shaft does not turn until well pressure applied to the Bourdon tube reaches a predetermined minimum.

12 Claims, 11 Drawing Figures

WELL PRESSURE MEASURING AND RECORDING DEVICE

This invention relates to apparatus for measuring and recording pressure in a well such as, for example, oil and gas wells. The device embodying this invention may be lowered into a well bore or well tubing on a wire line and produce a record in the form of a chart showing variations in well pressure at various levels in the well.

An important feature of the present invention is the provision of a motion multiplier device in the form of a gear train which is operatively positioned between a pressure sensing device such as a Bourdon tube and a conventional pressure recorder. Such a recorder has a cylindrical chart which moves axially and a stylus which moves angularly to produce a trace or graph on the chart. The relatively small arc of movement produced by the Bourdon tube is thus magnified to produce a greater arc of movement of the stylus. The ratio of the movement produced by the Bourdon tube to the movement of the stylus may be on the order of 10:1.

Another feature of the present invention is that the Bourdon tube may be pressurized at the ground surface so that the intensity of the internal pressure corresponds to pressure in a region in the well or well bore to be investigated. While the Bourdon tube remains pressurized, a radial pin is adjusted in a slot in a shaft to prevent turning movement of the shaft when pressure is relieved within the Bourdon tube. Another pin is adjusted in the shaft groove to limit the maximum extent of turning movement of the shaft as the pressure in the Bourdon tube increases, to prevent the stylus from moving off scale with respect to the chart in the recorder.

Other and more detailed objects and advantages will appear hereinafter.

Figure 1:
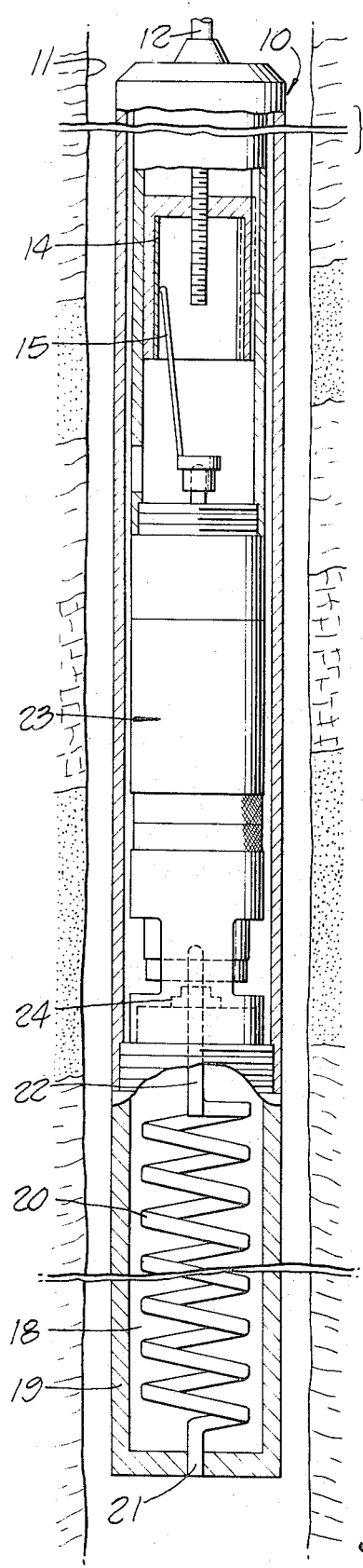
FIG. 1 is a diagrammatic sectional elevation showing a preferred embodiment of this invention as positioned in a well bore.
Figure 2A:
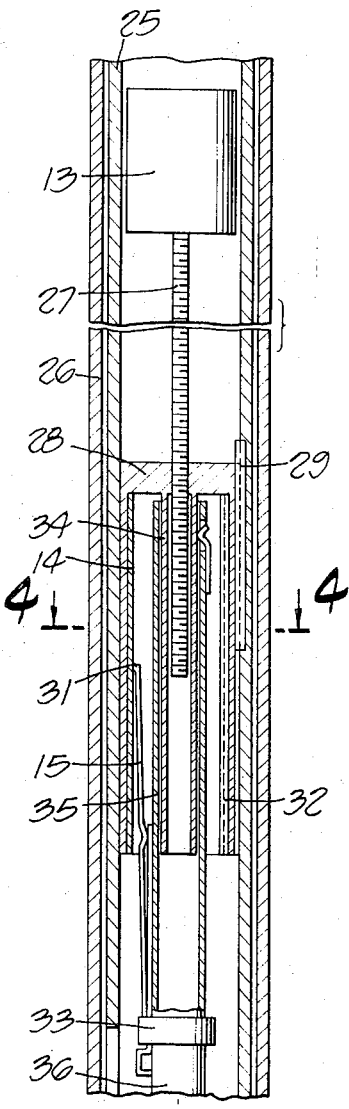
FIG. 2A is a sectional elevation showing the upper portion of the device.
Figure 2B:
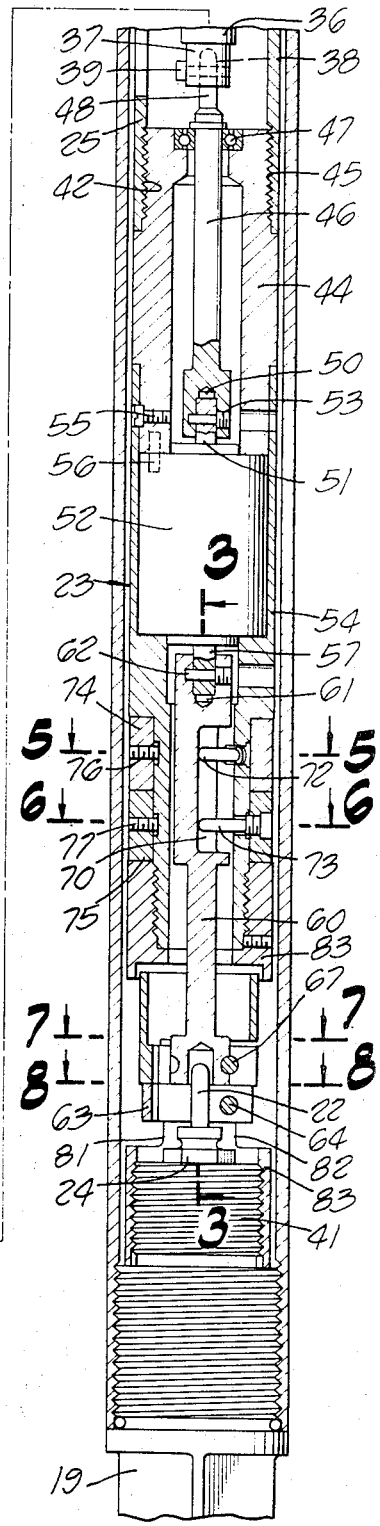
FIG. 2B is a sectional elevation constituting a continuation of the lower end of FIG. 2A.
Figure 3:
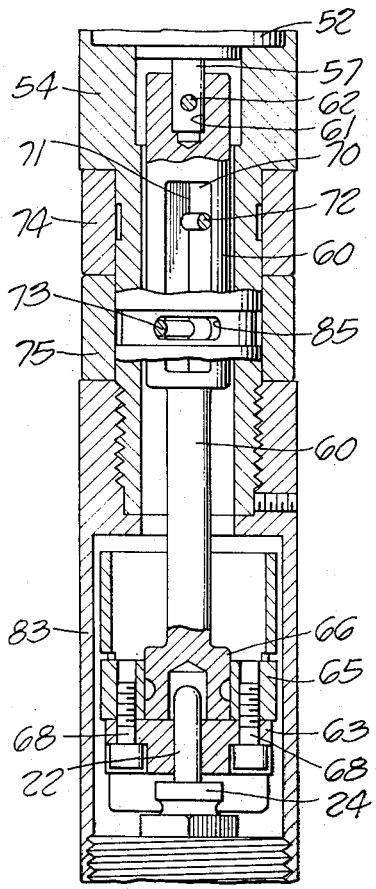
FIG. 3 is a sectional elevation taken substantially on the lines 3—3 as shown in FIG. 2B.
Figure 5:
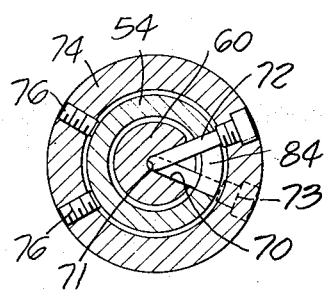
Figure 6:
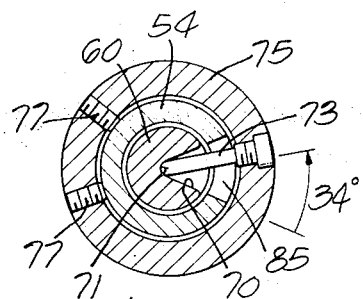
Figure 7:
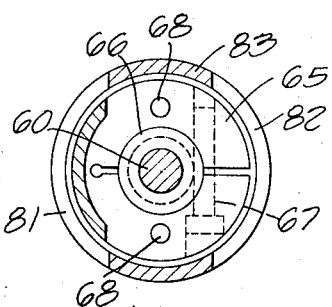
Figure 8:
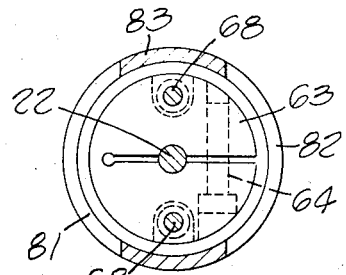

FIGS. 5, 6, 7 and 8 are transverse sectional views taken substantially on lines 5—5, 6—6, 7—7 and 8—8, respectively, as shown in FIG. 2B.

Figure 9:
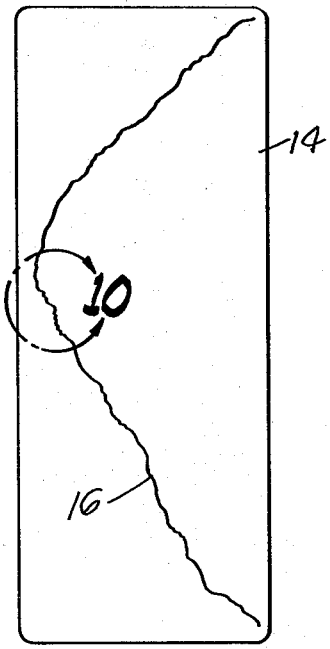

FIG. 9 is a chart showing how pressure in a particular well varies with depth in the well.

Figure 10:
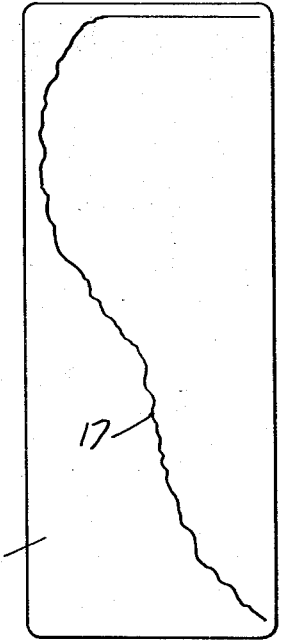

FIG. 10 is a similar chart obtained with the device of the present invention showing an enlargement of a particular area enclosed by the circle 10 shown on FIG. 9.

Referring to the drawings, a pressure sensing and recording device generally designated 10 is adapted to be run into a well bore 11 on a wire line 12. In the general plan of operation a clockwork mechanism 13 moves a cylindrical chart 14 axially while a stylus 15 engaging the chart turns in accordance with the intensity of the well pressure to produce a trace or graph 16 of the type shown in FIG. 9, or a trace or graph 17 of the type shown in FIG. 10.

The pressure measuring and recording device 10 carries a pressure sensing device 20 which may take the form of a cylindrical Bourdon tube fixed at its lower open end 21 and having an axial pin 22 at its upper end mounted to rotate about its longitudinal axis in a bearing and stuffing box assembly 24. The chamber 18 within the housing 19 and enclosing the Bourdon tube 20 is sealed against entry of well fluid, and therefore remains at atmospheric pressure. Well pressure admitted to the interior of the Bourdon tube 20 through the lower end 21 causes the upper pin 22 to rotate, and this rotation is communicated through intermediate mechanism 23 to the stylus 15.

Figure 4:
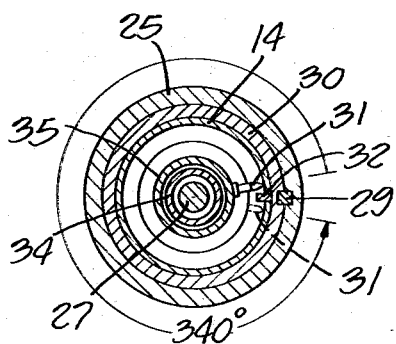
FIG. 4 is a transverse sectional view taken substantially on the lines 4—4 as shown in FIG. 2A.

The apparatus shown in FIG. 2 is conventional in form and includes a stationary tubular body 25 mounted within the housing 26 and enclosing the clockwork mechanism 13. A rotary screw 27 driven by the clockwork mechanism is engaged by a nut 28 which moves longitudinally of the body 25 but is prevented from turning by means of the key 29. The nut 28 has a cylindrical skirt which comprises a carrier for the removable chart 14. An axial rib 32 on the carrier 30 (FIG. 4) prevents turning movement of the chart 14 within the carrier 30.

Nut 28 also has a downward extending tube 34 which encloses the rotary screw 27 and which is received in telescopic relation with the upstanding tube 35 from the rotary part 36. The stylus 15 is mounted on this rotary part 36 and projects into the annular space between the upstanding tube 35 and the chart 14. The extreme upper end 37 of the stylus 15 is pointed so that it produces a trace or a graph on the chart 14. A slide collar is mounted on the rotary part 36 for holding the stylus 15 in retracted position, when desired.

For the initial run into the well bore 11, the intermediate mechanism 23 is omitted and the lower end 37 of the rotary part 36 is connected directly to the pin 22 at the upper end of the Bourdon tube 20. In this instance the pin 22 projects into the cavity 38 and the cross-pin 39 projects through a small aperture in the pin 22. The external threads 41 on the upper end of the Bourdon tube shell engage the internal threads 42 on the lower end of the body 25. The initial run of the device 10 into the well bore 11 (without the presence of the intermediate mechanism 23) produces a graph of the type shown at 16 in FIG. 9.

The intermediate mechanism 23 is employed in a second or subsequent run of the device into the well bore 11 and its purpose is to provide more detailed information regarding a preselected zone in the well bore. In effect a magnification of a portion of the chart of FIG. 9 is produced. The intermediate mechanism 23 includes a tubular body part 44 having external threads 45 which engage the internal threads 42 on the lower end of the body 25. A shaft 46 is carried in a bearing 47 in the body part 44 and has a projecting portion 48 received within the socket 38 and held by cross-pin 39.

The lower end of the shaft 46 has a socket 50 which receives the high speed output shaft 51 of a motion multiplier or gear box mechanism 52. A cross-pin 53 connects the shaft 51 to the shaft 46 for rotation. The gear box mechanism 52 is contained within the body part 54 connected to the body part 44 by radial pins 55 and axial alignment pin 56. The low speed input shaft 57 projects from the lower end of the gear box mechanism 52. A gear ratio of approximately 10:1 has been found to be satisfactory and, accordingly, for each degree of turning movement of the input shaft 57, the output shaft 51 turns 10°.

Shaft 60 has a socket 61 at its upper end for reception of the low speed shaft 57 and the parts 60 and 57 are connected for rotation by means of a cross-pin 62. A double clamp device is used for connecting the shaft 60 in driving relationship with the pin 22 at the upper end of the Bourdon tube 20. As shown in the drawings, the pin 22 is received in the split clamp-ring 63 and secured by clamp bolt 64. A second split clamp-ring 65 grips the cylindrical surface 66 at the lower end of the shaft 60 and is held in place by means of the clamp bolt 67. Axially extending threaded fastenings 68 connect the clamp-rings 63 and 65 for rotation as a unit. From this description it will be understood that turning movement of the pin 22 results in identical turning movement of the shaft 60.

Means are provided for limiting the extent of angular turning movement of the shaft 60, and hence the extent of angular turning movement of the pin 22 and the input shaft 57 for the gear box mechanism 52. As shown in the drawings, this means comprises a groove 70 in the shaft 60, the groove being wedge-shaped in cross section and having a rounded bottom 71. The groove 70 extends axially for some distance along the length of the shaft 60 and receives a pair of radially extending motion-limiting pins 72 and 73. Pin 72 is affixed to the adjusting collar 74 and the pin 73 is affixed to the adjusting collar 75. The pin 72 is used for limiting angular motion of the shaft 60 in one direction and the pin 73 is used to limit angular motion of the same shaft 60 in the other direction. Set screws 76 on the adjusting collar 74 are used to fix the collar 74 in desired angular position with respect to the stationary body part 54. Similar set screws 77 serve to fix the adjusting collar 75 in desired position with respect to the stationary body part 54.

In operation, the device is first assembled with the intermediate mechanism 23 omitted; the internal threads 42 on the body 25 are connected directly to the external threads 41 on the upper end of the body portion housing the Bourdon tube 20. The axially extending pin 22 at the upper end of the Bourdon tube 20 is received in a socket 38 of a coupling part 36 and connected by cross-pin 39. The nut 28 is in its uppermost position with respect to the rotary screw 27, and the point 37 of the stylus 15 engages the chart 14 near its lower end and near the position of the axial rib 32. The slide collar 33 is lowered to the position shown in FIG. 2A to permit the stylus point 31 to engage the cylindrical chart 14.

The device 10 is then lowered into the bore hole 11 by the wire line 12. Downward movement of the device occurs at a known rate of travel, while the clockwork mechanism turns the rotary screw 27 to move the nut 28 and chart 14 downward at a predetermined rate within the body 25. Increasing pressure in the well bore 11 is transmitted to the interior of the Bourdon tube 20 causing it to "unwind" and thereby turn its upper pin 22. The pin 22 at this time is connected directly to the coupling 37 of the member 36, and, accordingly, the stylus 15 is given an angular motion which is the same in direction and extent as the angular motion of the pin 22. A graph or trace 16 of the general style shown in FIG. 9 is produced on the chart 14, the trace 16 being inclined in one direction during lowering movement of the device into the well bore, and the remainder of the trace being inclined in the other direction to show the reduction in the well pressure as the device 10 is withdrawn upward from the well bore.

In order to obtain a more detailed trace of pressure variations at a particular level in the well bore 11, the intermediate mechanism 23 is inserted between the Bourdon tube 20 and the coupling 37 which drives the stylus 15 of the recording apparatus. The shaft 46, gear box mechanism 52, shaft 60 and clamp collars 63 and 65 are then placed in position as shown in the drawings, and the clamp bolt 64 is tightened on the pin 22. A fresh chart 14 is placed in position within the carrier 30 after the nut 28 has been returned to its initial position. The interior of the Bourdon tube 20 is then pressurized through its open lower end 21 to a pressure corresponding to the minimum pressure to be checked in the well bore. This causes counterclockwise turning movement of the pin 22, as viewed in FIG. 8. The clamp bolt 64 is then tightened, and the adjusting collar 74 is anchored by set screws 76 to hold the radial pin 72 in the position shown in FIG. 5. Clockwise motion of the pin 22 and shaft 60 is thus prevented.

The other adjusting collar 75 and its radial pin 73 are then moved through an angular distance to permit about 34° of counterclockwise movement of the shaft 60. Since the stylus 15 travels 10° for each degree of movement of the pin 22 of the Bourdon tube 20 by reason of the 10:1 ratio of the gear box mechanism 52, the 34 degrees of angular movement permitted for the shaft 60 converts to an angular movement of the stylus 15 of about 340°, or somewhat less than one full turn.

Windows 81 and 82 are provided in the body part 33 for access to the clamping bolts 64 and 67 and to the threaded connection 68. Slots 84 and 85 in the body part 54 provide clearance for angular movement of the pins 72 and 73, respectively.

After the Bourdon tube 20 has been pressurized and after the location of the radial pins 72 and 73 has been fixed to correspond to the extreme angular travel positions of the stylus 15, pressure in the Bourdon tube is released and the device is again lowered into the bore hole 11 on the wire line 12. The lowering movement is rapid until the zone to be investigated is reached. The lowering movement is then reduced to a predetermined low speed of travel. Because of the location of the radial pin 73 in the groove 70, the shaft 60 does not begin to turn until well pressure intensity in the bore hole is sufficient to move the shaft 60 counterclockwise with respect to the radial pin 73. Thereafter, each increment of well pressure causes an increment of turning movement of the pin 22 at the upper end of the Bourdon tube 20. This increment of angular travel is multiplied 10 times by the gear box mechanism 52, assuming that the gear ratio is 10:1. Accordingly, for each degree of angular travel of the pin 22 the stylus 15 moves 10°. As before, the clockwork mechanism 13 produces a downward travel of the chart carrier 30 at a predetermined rate with respect to the body 25. Accordingly, the trace 17 is produced on the chart as shown in FIG. 10, and in essence this comprises a detailed enlargement of the portion of the chart of FIG. 9 contained within the circle 10.

Having fully described my invention, it is to be understood that I am not to be limited to the details herein set forth but that my invention is of the full scope of the appended claims.

I claim:

1. In a pressure measuring and recording device for use in a well, the combination of: a housing adapted to be lowered into the well bore, a pressure sensitive device carried by the housing and exposed to pressure in the well, an element driven by the pressure sensitive device and mounted to turn within the housing, a recorder mechanism in the housing having a member mounted to turn, adjustable means for limiting the extent of turning movement of said element in at least one direction, and a multiplier device operatively interposed between said element and said member for turning said member through a greater arc of travel in response to a lesser arc of travel by said element.

2. In a pressure measuring and recording device for use in a well, the combination of: a housing adapted to be lowered into the well bore, a pressure sensitive device carried by the housing and exposed to pressure in the well, an element driven by the pressure sensitive device and mounted to turn within the housing, a recorder mechanism in the housing having a member mounted to turn, adjustable means for limiting the extent of turning movement of said element in both directions, and a multiplier device operatively interposed between said element and said member for turning said member through a greater arc of travel in response to a lesser arc of travel by said element.

3. In a pressure measuring and recording device for use in a well, the combination of: a housing adapted to be lowered into a well, a Bourdon tube carried by the housing and having one end positioned for open communication with the interior of the well, an axially extending element mounted to turn in the housing and driven by said Bourdon tube in response to changes in pressure within the well, pressure recorder mechanism in the housing having a movable member, and means in the housing operatively interposed between said element and said member for driving said pressure recorder mechanism from said Bourdon tube, said means including adjustable means for limiting the extent of turning movement of said element in one direction corresponding to a predetermined pressure intensity within said Bourdon tube.

4. The combination set forth in claim 3 wherein said adjustable means comprises a shaft having a longitudinally extending wedge-shaped groove, together with a pin extending into the groove to limit turning movement of the shaft.

5. In a pressure measuring and recording device for use in a well, the combination of: a housing adapted to be lowered into a well, a multiple-turn cylindrical Bourdon tube carried by the housing and having an open lower end fixed with respect to the housing and in communication with the interior of the well, an axially extending element mounted to turn in the housing and driven by said Bourdon tube in response to changes in pressure within the well, a pressure recorder mechanism in the housing having a movable member, a shaft mounted to turn in the housing and connecte to said element, the shaft having a wedge-shaped groove in its outer surface, a collar having a connected thereon projecting into the groove, means for fixing the collar with respect to said housing so that the pin engages a side wall of the groove to limit turning movement of the shaft in one direction, and means including a multiplier device operatively interposed between said shaft and said member for turning said member through a greater arc of travel in response to a lesser arc of travel by said shaft.

6. The combination set forth in claim 5 in which a second pin on a second collar extends into said groove, and means for fixing the second collar with respect to said housing to limit turning movement of the shaft in the other direction.

7. The combination set forth in claim 5 in which the Bourdon tube is enclosed within a pressure tight chamber and wherein said axially extending element extends through a seal in a wall of that chamber.

8. For use in a well pressure measuring and recording device having a Bourdon tube for open communication with the interior of the well and having a driven element, the device also having a pressure recorder mechanism provided with a movable member, the improvement comprising in combination: a housing for supporting the Bourdon tube and its driven element and for supporting the pressure recorder mechanism and its movable member, means in the housing operatively interposed between said element and said member for driving said pressure recorder mechanism from said Bourdon tube, said means including adjustable means for limiting the extent of turning movement of said element in one direction corresponding to a predetermined pressure intensity within said Bourdon tube.

9. The combination set forth in claim 8 wherein said adjustable means comprises a shaft having a longitudinally extending wedge-shaped groove, together with a pin extending into the groove to limit turning movement of the shaft.

10. For use in a well pressure measuring and recording device having a Bourdon tube for open communication with the interior of the well and having a driven element, the device also having a pressure recorder mechanism provided with a movable member, the improvement comprising in combination: a housing for supporting the Bourdon tube and its driven element and for supporting the pressure recorder mechanism and its movable member, a shaft mounted to turn in the housing and connected to said element, the shaft having a wedge-shaped groove in its outer surface, a collar having a pin thereon projecting into said groove, means for fixing the collar with respect to said housing so that the pin engages a side wall of the groove to limit turning movement of the shaft in one direction, and means including a multiplier device operatively interposed between said shaft and said member for turning said member through a greater arc of travel in response to a lesser arc of travel by said shaft.

11. The combination set forth in claim 10 in which a second pin on a second collar extends into said groove, and means for fixing the second collar with respect to said housing to limit turning movement of the shaft in the other direction.

12. The combination set forth in claim 10 in which the Bourdon tube is enclosed within a pressure tight chamber and wherein said axially extending element extends through a seal in a wall of that chamber.

* * * * *